US012686226B2

(12) United States Patent
Sun

(10) Patent No.: US 12,686,226 B2
(45) Date of Patent: Jul. 21, 2026

(54) THREE-DIMENSIONAL BOUQUET GREETING CARD

(71) Applicant: Jingyun Sun, Shenzhen City (CN)

(72) Inventor: Jingyun Sun, Shenzhen City (CN)

( * ) Notice: Subject to any disclaimer, the term of this patent is extended or adjusted under 35 U.S.C. 154(b) by 68 days.

(21) Appl. No.: 18/822,331

(22) Filed: Sep. 2, 2024

(65) Prior Publication Data

US 2025/0353318 A1 Nov. 20, 2025

(51) Int. Cl.
*B42D 15/04* (2006.01)
*B42D 15/02* (2006.01)

(52) U.S. Cl.
CPC ......... *B42D 15/045* (2013.01); *B42D 15/022* (2013.01)

(58) Field of Classification Search
CPC .. B42D 15/045; B42D 15/022; B42D 15/042; G09F 1/06; G09F 1/08
See application file for complete search history.

(56) References Cited

U.S. PATENT DOCUMENTS 11,793,255 B2 * 10/2023 Karpiel .................... A41G 1/00
11,842,656 B2 * 12/2023 Hewitt ...................... G09F 1/06
12,023,950 B2 * 7/2024 Larson ................. B42D 15/045
12,108,714 B1 * 10/2024 Liang ........................ G09F 1/06
2021/0339551 A1 * 11/2021 Nejad ........................ G09F 1/06
2022/0122487 A1 * 4/2022 Bucco ........................ G09F 1/06
2024/0092112 A1 * 3/2024 Larson ................. B42D 15/045

FOREIGN PATENT DOCUMENTS

CN 120963231 A * 11/2025 ........... B42D 15/022
EP 4487722 A1 * 1/2025 ............... G09F 1/08
EP 4650181 A1 * 11/2025 ........... B42D 15/022
WO WO-2023222141 A1 * 11/2023 ............ B65D 85/50

* cited by examiner

*Primary Examiner* — Cassandra Davis
(74) *Attorney, Agent, or Firm* — Daniel M. Cohn; Howard M. Cohn

(57) ABSTRACT

The present invention discloses a three-dimensional bouquet greeting card, including the flower bundle base and internal petal inserts. The flower bundle base is composed of a bouquet base, a bottom cover and a layer of central petals. It is characterized in that: The bouquet base is formed by bonding the head and tail of a sheet of material together. There are symmetrically indentation lines at both left and right ends. The bottom cover is connected to the bottom of the bouquet base. The bottom cover has a folding indentation line. This folding indentation line is connected to an internal flower piece and is in the same plane as the indentation line provided on the bouquet base. The three-dimensional bouquet greeting card, through the ingenious linkage structure arranged inside the three-dimensional bouquet greeting card, can very conveniently change the three-dimensional bouquet greeting card from a flat state to a three-dimensional state. It is convenient and reliable, easy to install, and the operation can be easily completed by the public. Moreover, the production and manufacturing cost is also low.

8 Claims, 16 Drawing Sheets

THREE-DIMENSIONAL BOUQUET GREETING CARD

RELATED APPLICATIONS

This application is related to C.N. patent application No. 2024106118782, filed on May 16, 2024.

TECHNICAL FIELD

The present disclosure relates to a three-dimensional display handicraft, specifically to a three-dimensional bouquet greeting card with a three-dimensional space display effect.

BACKGROUND ART

The three-dimensional bouquet greeting card is a handmade product that combines both artistry and creativity. Through ingenious folding and decorative designs, it transforms the traditional flat greeting card into a three-dimensional form, thereby enhancing the artistic sense and interestingness of the greeting card. The design feature of this greeting card lies in its utilization of symmetrical structures and the principle of quadrilaterals. Through methods such as pasting, cutting, folding, splicing, and adding movable mechanisms, the flat pattern leaps onto the paper. When the greeting card is opened, the bouquet presents a three-dimensional effect, and when closed, it reverts to a flat state. This transformation not only increases the interactivity of the greeting card but also enables the reader to be pleasantly surprised and feel the unique charm of the three-dimensional bouquet greeting card.

However, when producing and selling three-dimensional bouquet greeting cards, the following problems are faced. If the greeting cards are produced and placed on the market in their final display effect, due to their large volume, they are inconvenient for transportation and delivery, and the cost is also high, making the product lose its competitiveness.

Therefore, the present invention aims to provide a three-dimensional bouquet greeting card with a simple structure that is convenient for production, storage, and transportation to meet market demands.

SUMMARY OF THE INVENTION

The purpose of the present invention is to provide a three-dimensional bouquet greeting card to solve the technical deficiencies mentioned in the above background.

To achieve the above purpose, the present invention provides the following technical solution: A three-dimensional bouquet greeting card, including the flower bundle base and internal petal inserts. The flower bundle base is composed of a bouquet base, a bottom cover, and a layer of central petals. Among them: The bouquet base is a bouquet shape formed by bonding the head and tail of a sheet of material together. There is a folding indentation line symmetrically provided at each of the left and right ends. The bottom cover is partially connected to the bottom of the bouquet base. There is also a folding indentation line in the middle of the bottom cover. This folding indentation line is connected to an internal central petal and is in the same plane as the indentation line for folding provided on the bouquet base.

Furthermore, the included flower shell main body is a single sheet of paper. After cutting, folding, and bonding, it forms the bouquet base, the bottom cover, and the central petals. The central petals can move in the vertical direction, allowing the bouquet greeting card to switch between the flat state and the three-dimensional state.

Furthermore, the bouquet base is provided with a plurality of positioning slots for installing the internal petal inserts.

Furthermore, the bouquet base is also adhered with surrounding petals. There is a plurality of petal card slots on the surrounding petals for mutual snap-fitting and fixation with the internal shaped petal inserts.

Furthermore, there are also a plurality of shaped petal inserts inside the three-dimensional bouquet greeting card.

Furthermore, the internal shaped petal inserts are two mutually crossed two-piece petal inserts. When unfolded, they form an X-shaped cross. Installed in the bouquet, they can be expanded or folded.

Furthermore, the internal shaped petal insert is a single-piece petal. The single-piece petal is provided with no less than one vertical indentation line. Installed in the bouquet, the upper part is clamped with the card slot on the surrounding petals, and the lower part is mutually snap-fitted and fixed with the positioning slot of the bouquet base.

Furthermore, there is also an acousto-optic device inside the three-dimensional bouquet greeting card.

Compared with the prior art, the beneficial effect of the present invention is that through the stretching structure set inside the three-dimensional bouquet greeting card, the three-dimensional bouquet can be conveniently changed from the flat state to the three-dimensional state. It is convenient and reliable, easy to disassemble and assemble, and can be easily operated by the public. Moreover, the production and manufacturing cost is also low.

The meanings of the reference marks in the figures are as follows: 100—Flower shell main body, 101—Base, 102—Bottom cover, 103—Central petal, 200—Second cutting piece of the left surrounding petal, 300—Third cutting piece of the right surrounding petal, 400—Fourth cutting piece of the left shaped petal, 500—Fifth cutting piece of the right shaped petal, 600—Sixth cutting piece of the shaped petal, 1011—Folding indentation line, 1012—Folding indentation line, 1013—Petal card slot.

DESCRIPTION OF EMBODIMENTS

The following is a detailed description of the present patent's technical solution in combination with specific implementation methods.

As shown in FIGS. 1, 2, 3 and 4, a three-dimensional bouquet greeting card includes a bouquet base 101, a bottom cover 102, and an internal central petal 103. Among them: The bouquet base 101 is a bouquet shape formed by bonding the head and tail of a sheet of material together. There is a folding indentation line 1011 symmetrically provided at each of the left and right ends. The bottom cover 102 is connected to the bottom of the bouquet base 101. There is also a folding indentation line 1012 in the middle of the bottom cover. This folding indentation line 1012 is connected to an internal central petal 103 and is in the same plane as the folding indentation line 1011 provided on the bouquet base 101.

Figure 5:
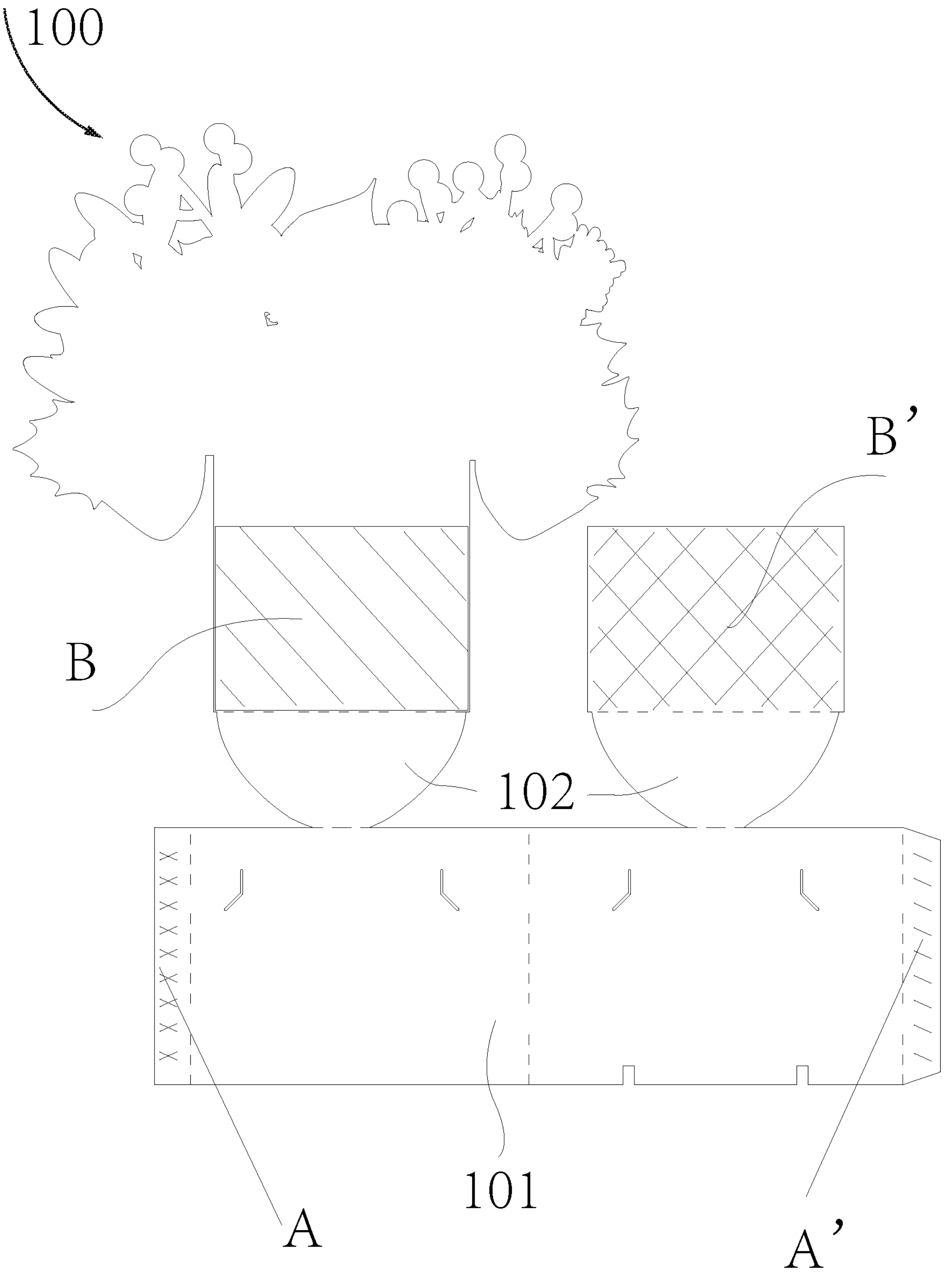
FIG. 5 is the structural schematic diagram of the first cutting piece of a three-dimensional bouquet greeting card described in the embodiment.
Figure 6:
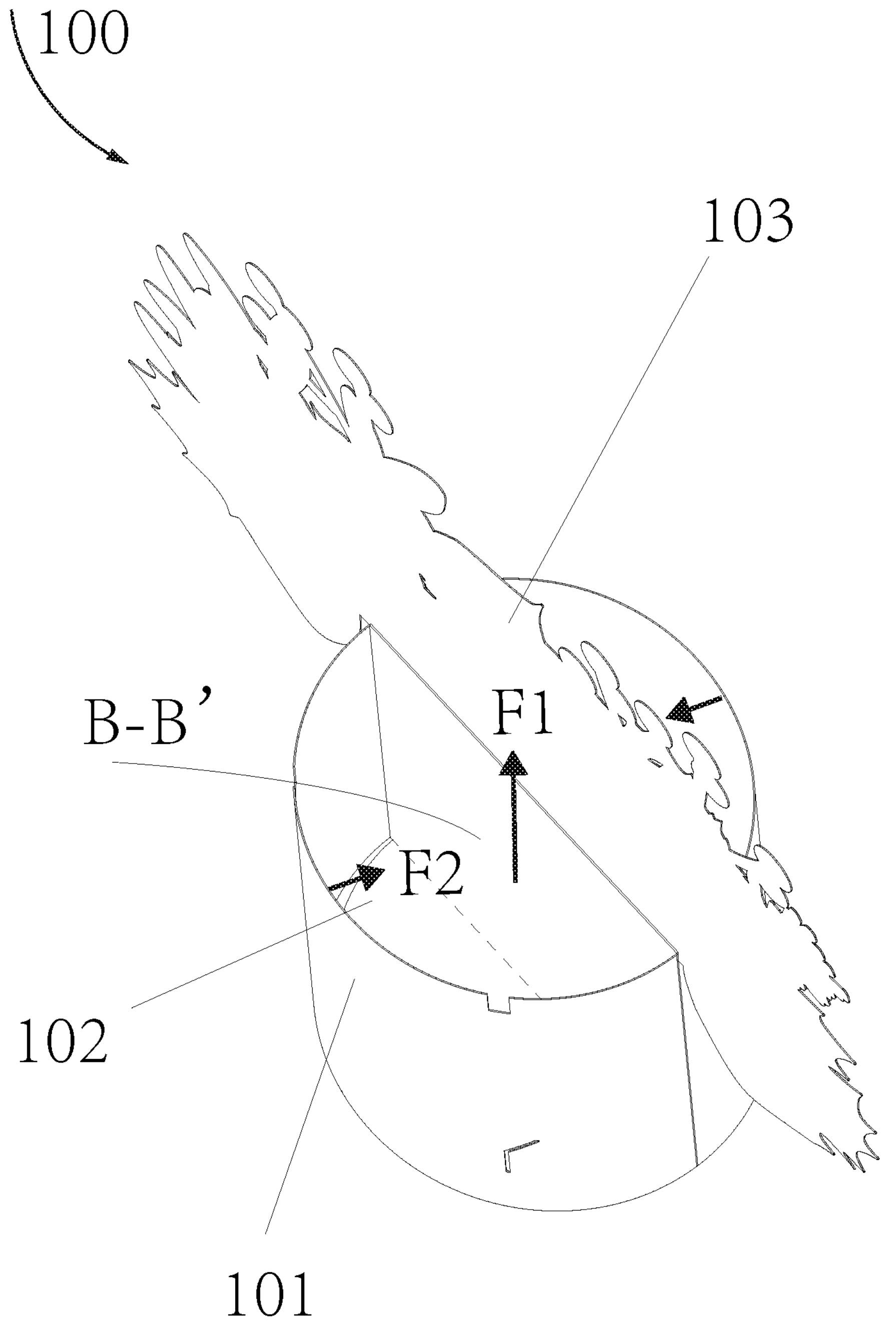
FIG. 6 is the three-dimensional structural schematic diagram obtained by folding and bonding the first cutting piece structure shown in FIG. 5.

As shown in FIG. 5 or FIG. 6, it is the structural schematic diagram of the first cutting piece of the embodiment. It is a single sheet of paper. After cutting, folding, and bonding points AA' and BB', the bouquet base 101, the bottom cover 102, and the internal central petal 103 are formed.

Figure 2:
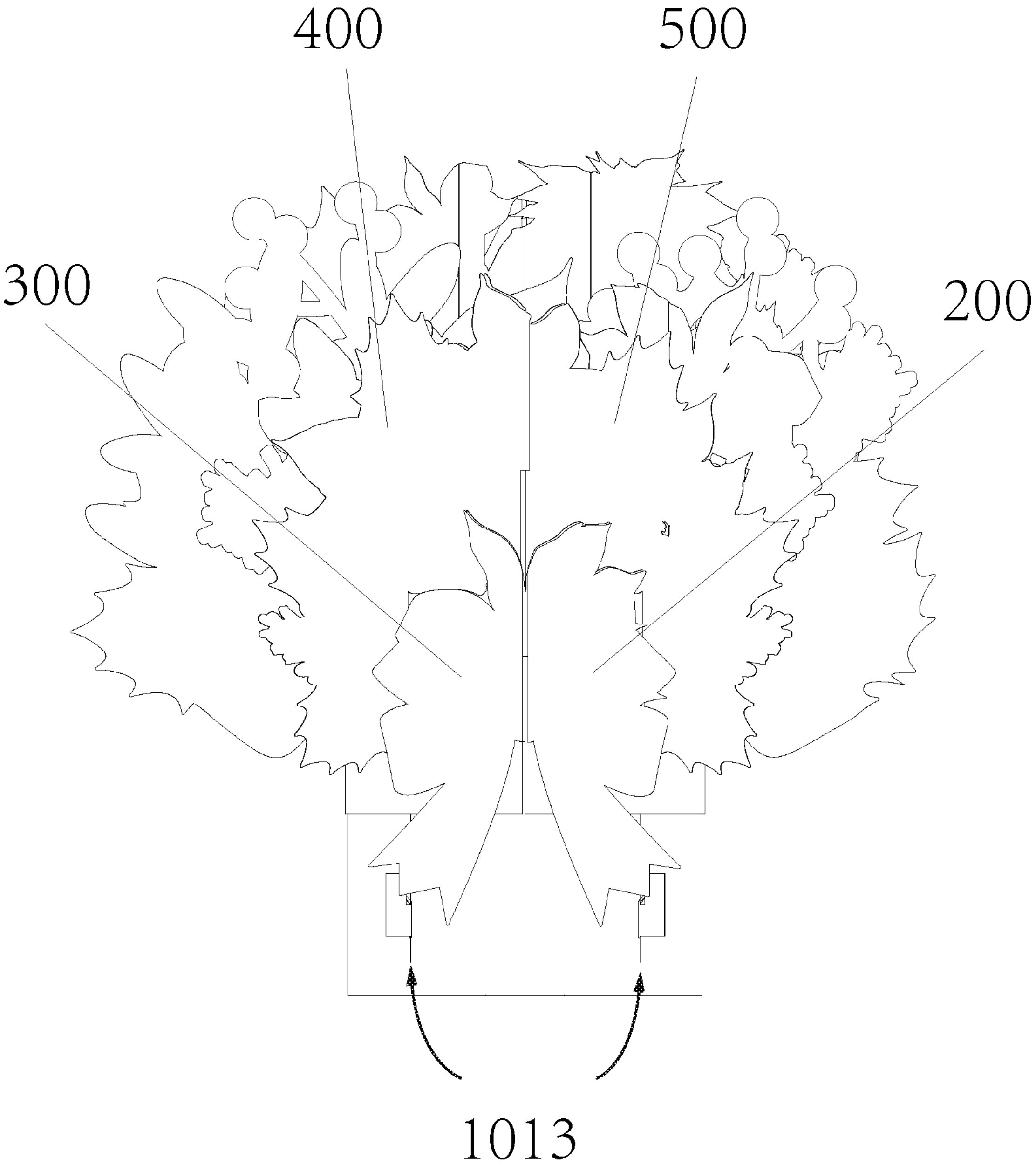
FIG. 2 is the front view of a three-dimensional bouquet greeting card described in the embodiment.
Figure 3:
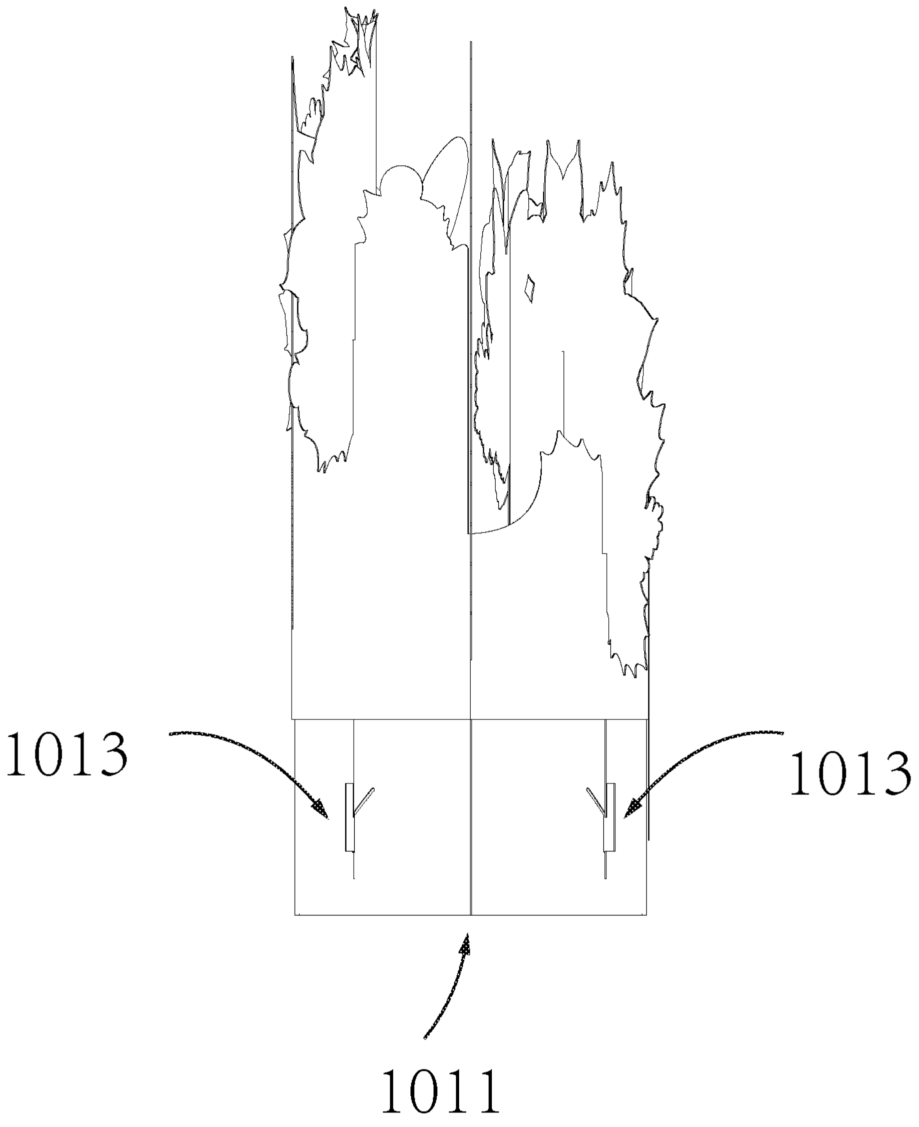
FIG. 3 is the left view of a three-dimensional bouquet greeting card described in the embodiment.
Figure 4:
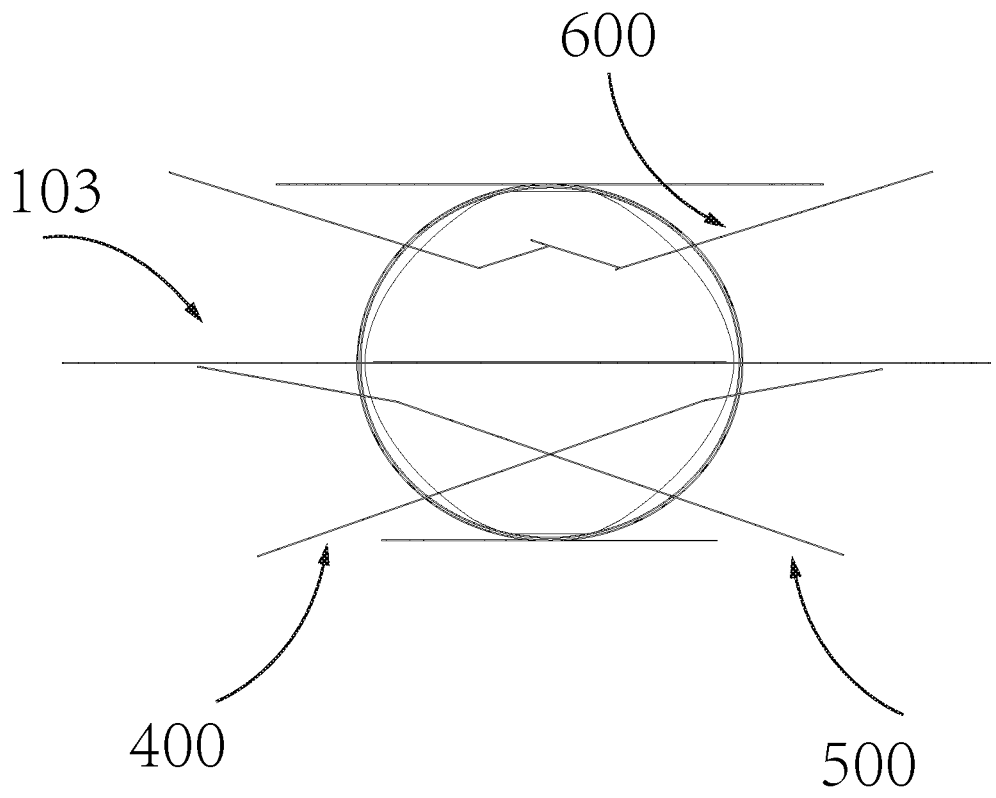
FIG. 4 is the top view of a three-dimensional bouquet greeting card described in the embodiment.

As shown in FIG. 2, the bouquet base is provided with a plurality of positioning slots 1013 for installing the internal petal inserts.

Figure 7:
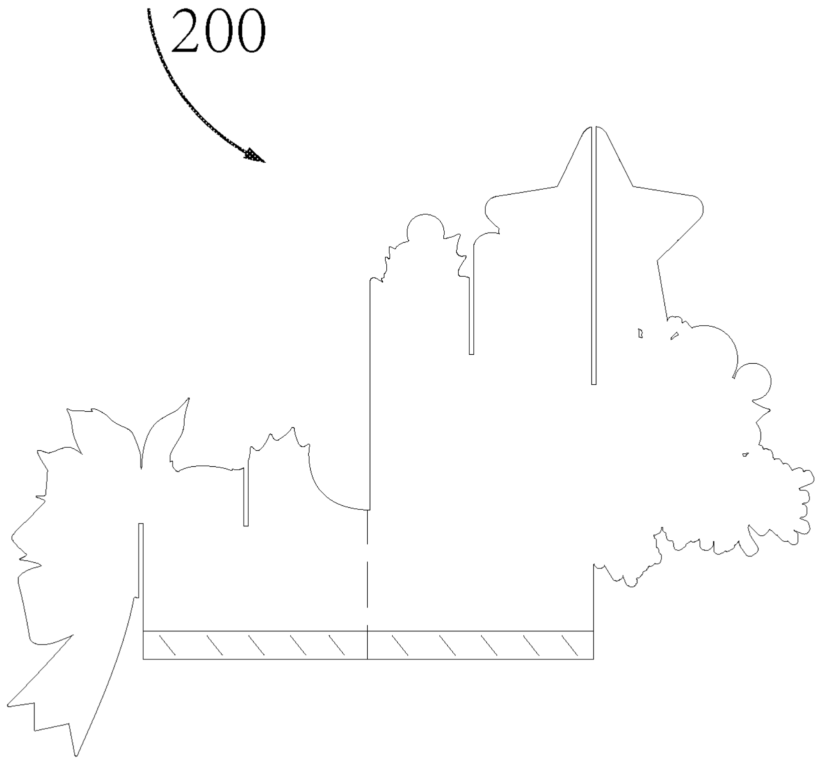
FIG. 7 is the left structural schematic diagram of the second cutting piece of the surrounding petals of a three-dimensional bouquet greeting card described in the embodiment.
Figure 8:
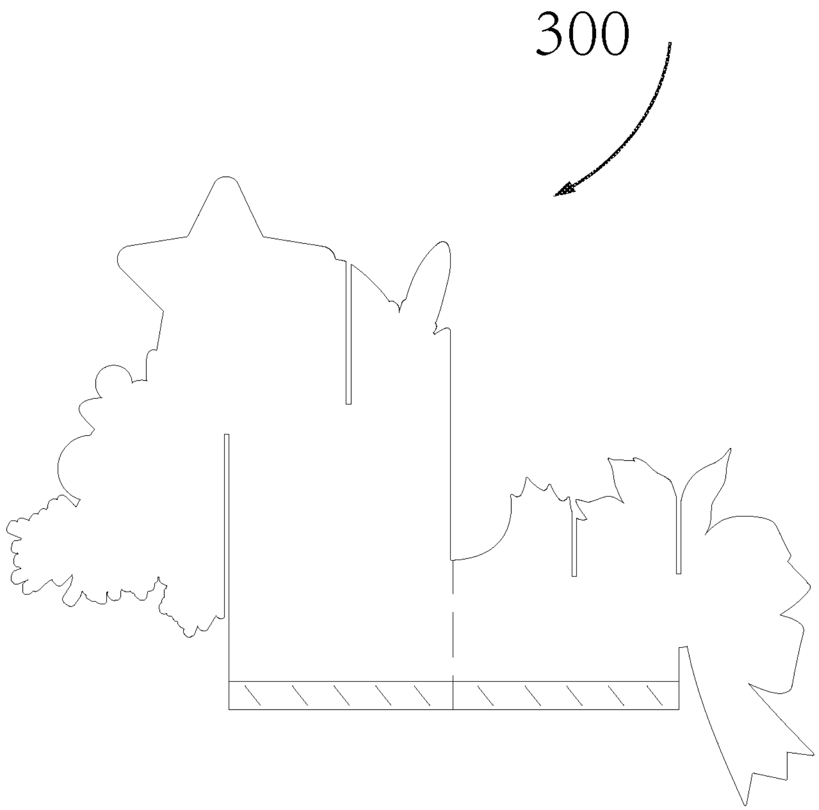
FIG. 8 is the right structural schematic diagram of the third cutting piece of the surrounding petals of a three-dimensional bouquet greeting card described in the embodiment.
Figure 9:
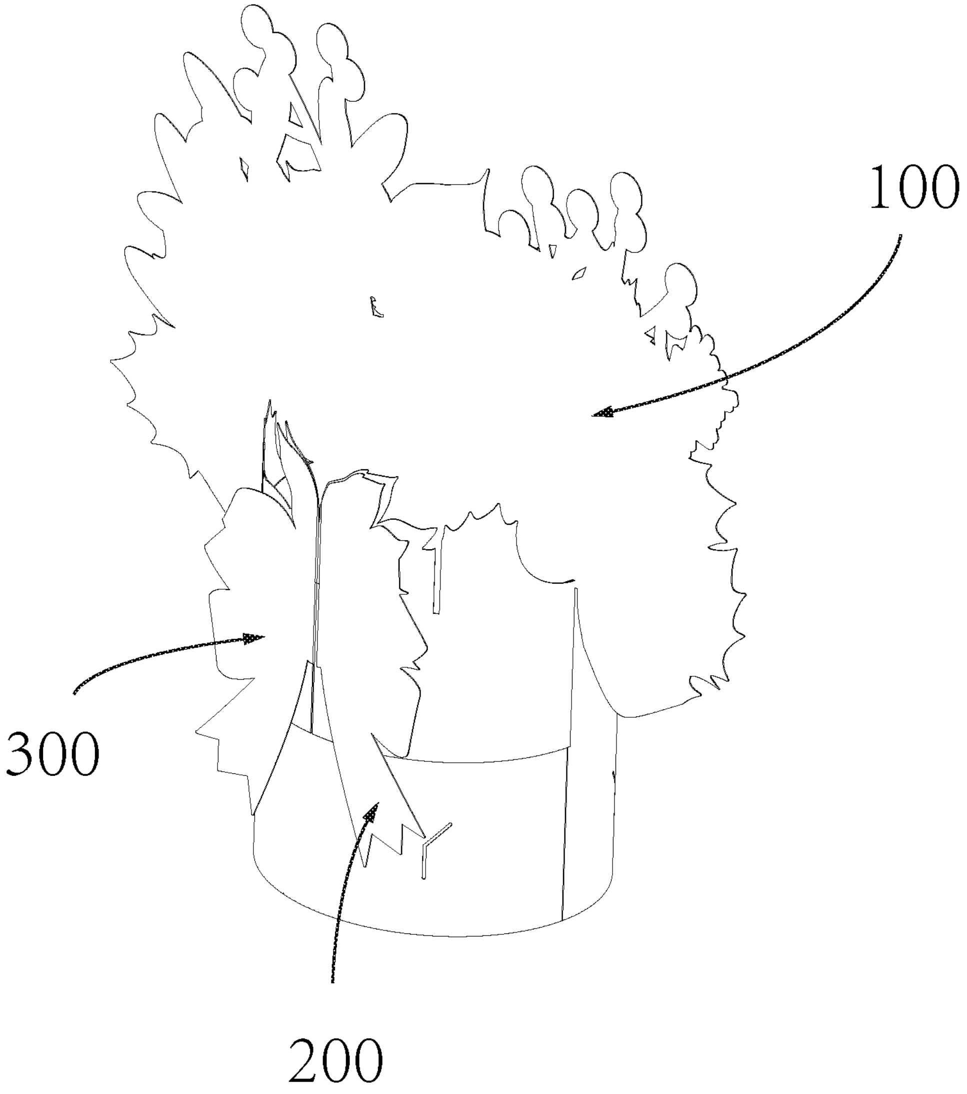
FIG. 9 is one of the three-dimensional bouquet greeting card structures obtained by bonding FIGS. 6, 7 and 8.
Figure 10:
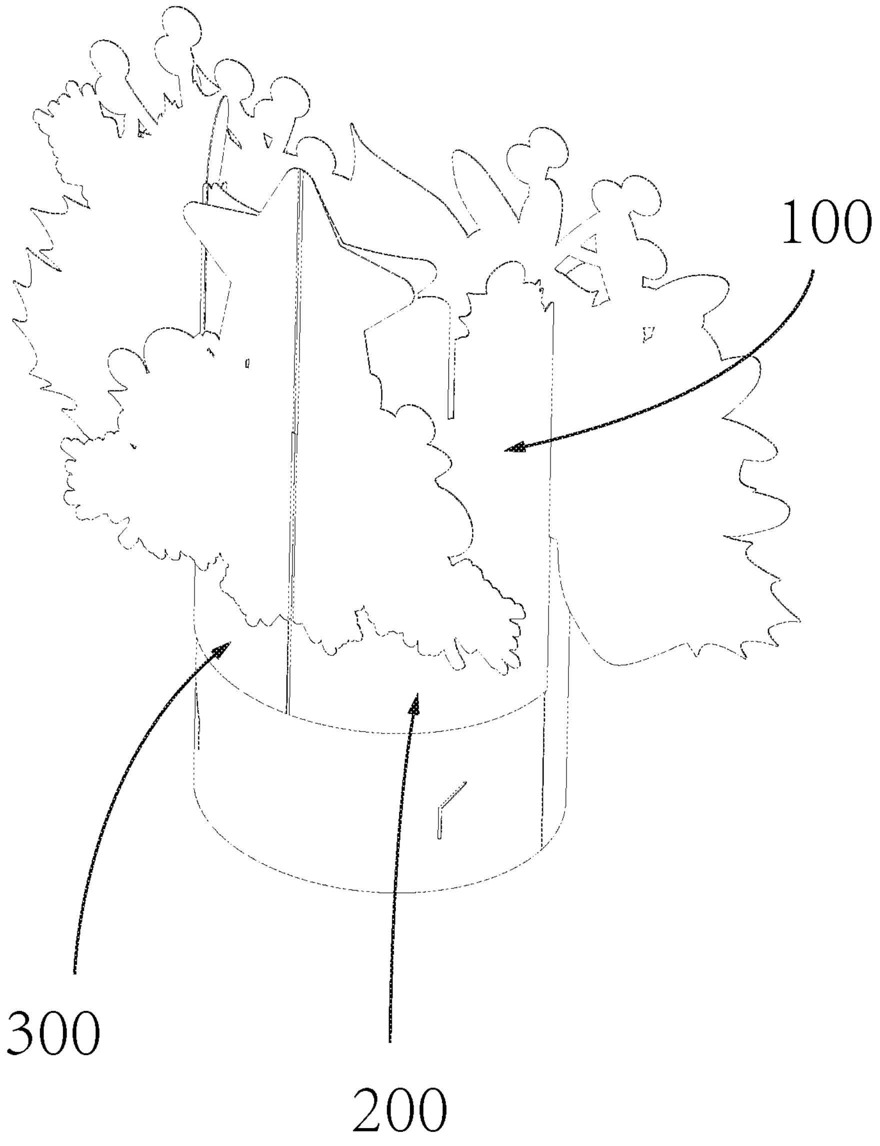
FIG. 10 is the second three-dimensional bouquet greeting card structure obtained by bonding FIGS. 6, 7 and 8.

As shown in FIG. 7 or FIG. 8, the bouquet base is also adhered with surrounding petals, including the second cutting piece 200 and the third cutting piece 300. There are a plurality of petal card slots on the surrounding petals for mutual snap-fitting and fixation with the internal shaped petal inserts.

There are also a plurality of shaped petal inserts inside the three-dimensional bouquet greeting card.

Figure 11:
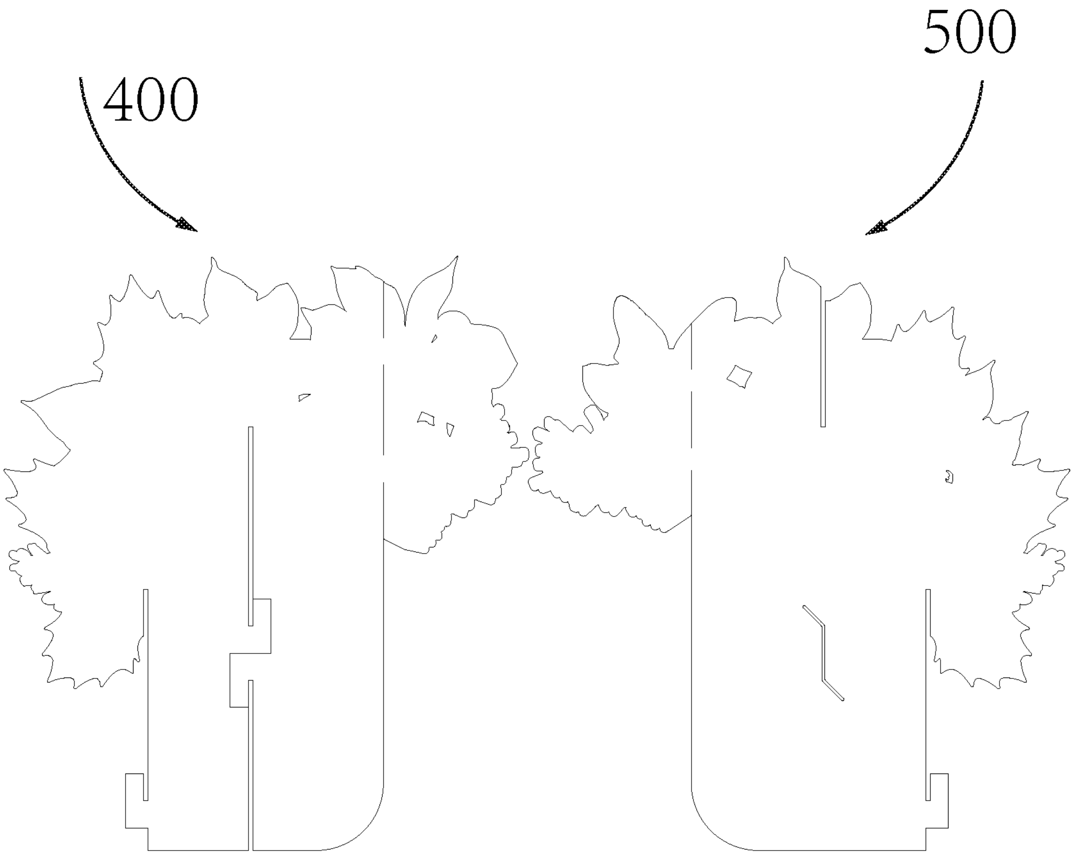
FIG. 11 is the structural schematic diagram of the fourth and fifth cutting pieces (two-piece petal inserts) of a three-dimensional bouquet greeting card described in the embodiment.
Figure 12:
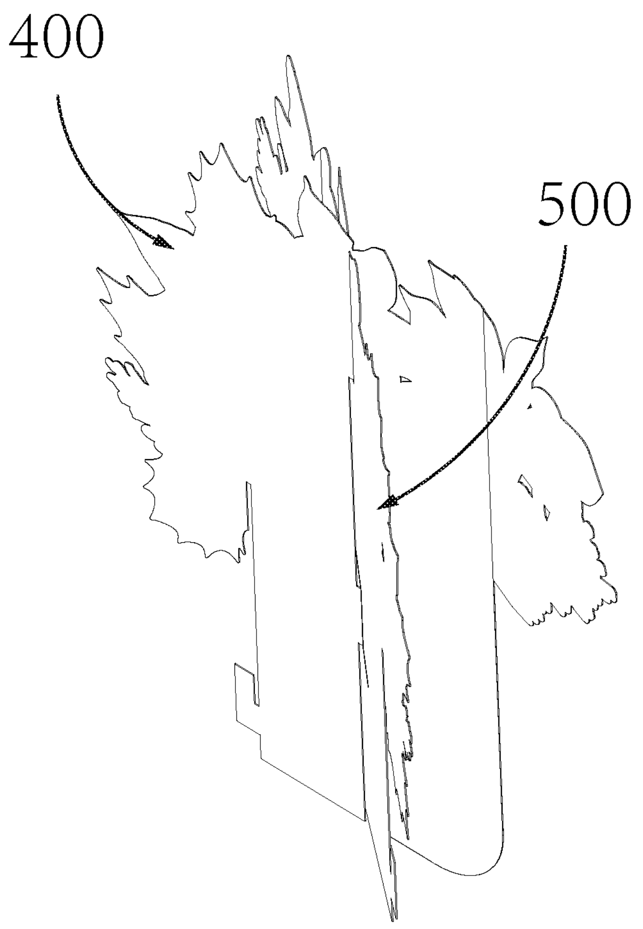
FIG. 12 is the structural schematic diagram of the two-piece petal insert obtained by combining FIG. 11.
Figure 13:
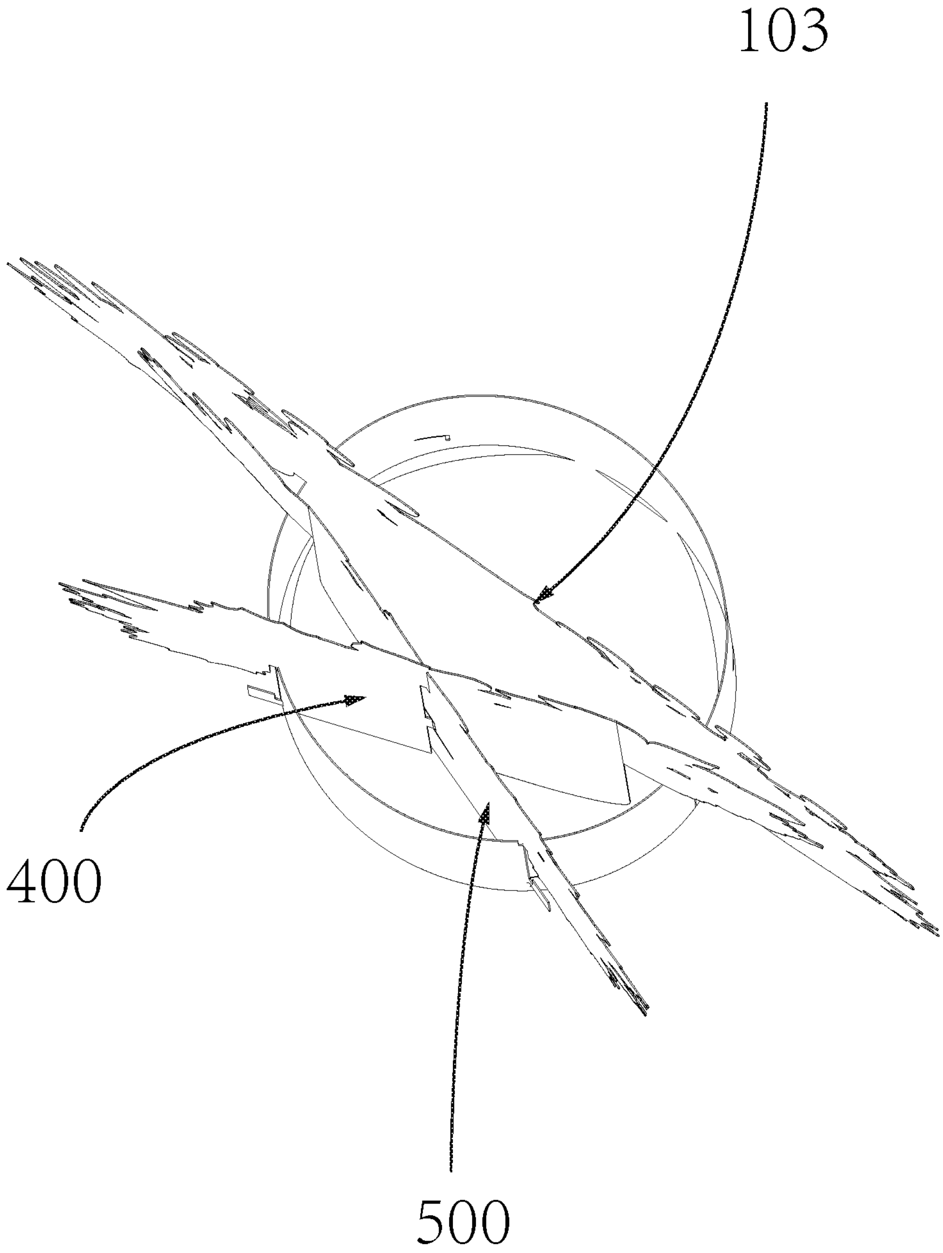
FIG. 13 is the structural schematic diagram obtained after the two-piece petal insert shown in FIG. 12 is installed.
Figure 14:
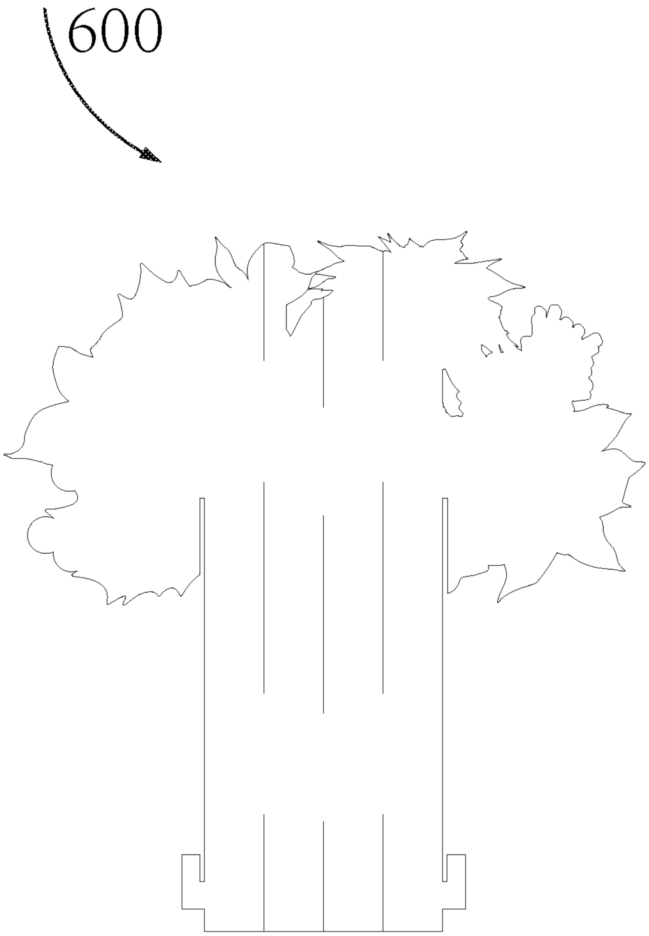
FIG. 14 is the structural schematic diagram of the sixth cutting piece (single-piece petal) of a three-dimensional bouquet greeting card described in the embodiment.

As shown in FIG. 11 or FIG. 12, the internal shaped petal insert is a two-piece petal insert that is mutually crossed, including the fourth cutting piece 400 and the fifth cutting piece 500. When unfolded, it forms an X-shaped cross. Installed in the bouquet, it can be expanded or folded.

The internal shaped petal insert is a single-piece petal of the fifth cutting piece 600. The single-piece petal is provided with no less than one vertical indentation line. Installed in the bouquet, the upper part is clamped with the card slot on the surrounding petals, and the lower part is mutually snap-fitted and fixed with the positioning slot of the bouquet base.

There is also an acousto-optic device 700 inside the three-dimensional bouquet greeting card.

Figure 1:
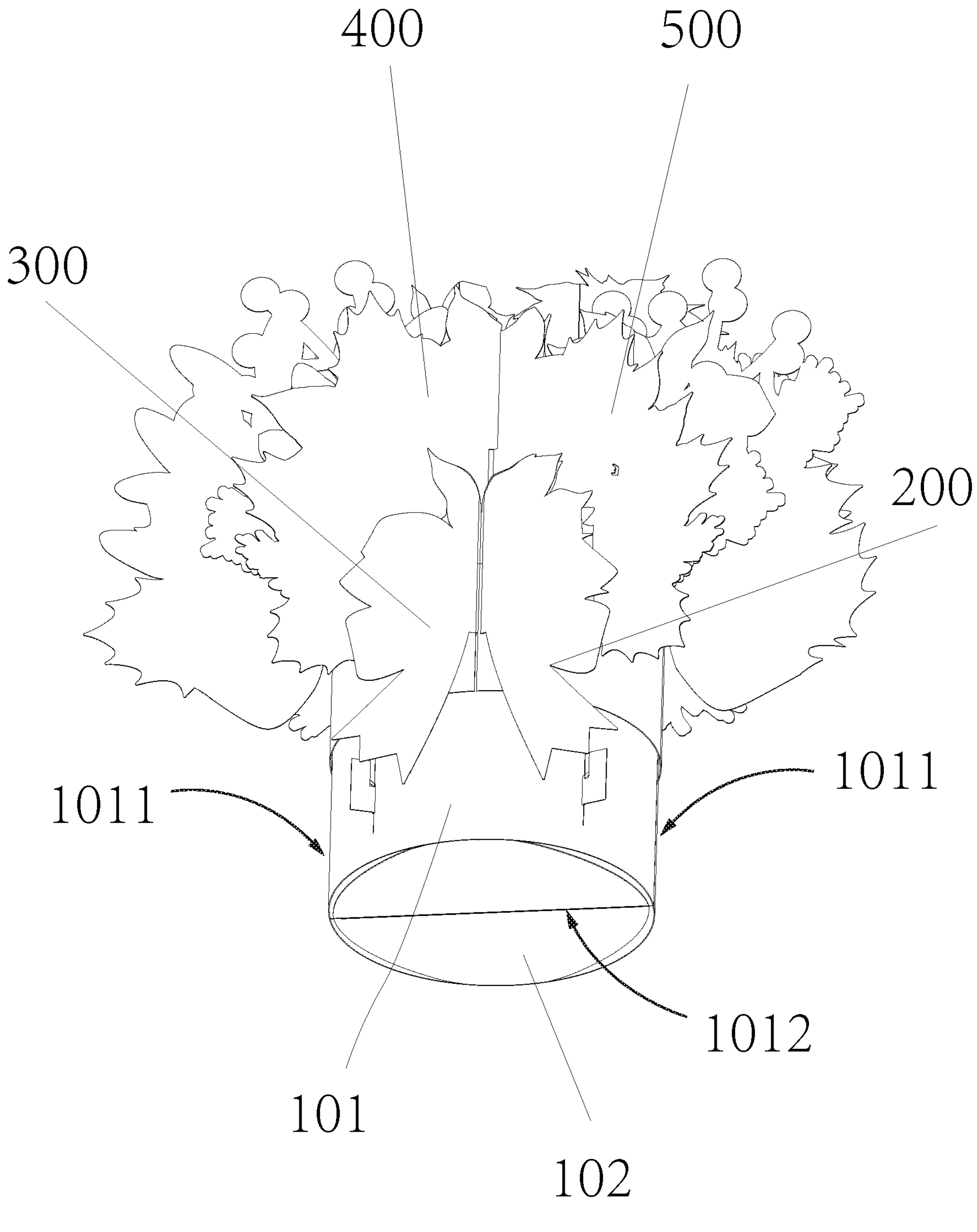
FIG. 1 is a three-dimensional schematic diagram of a three-dimensional bouquet greeting card described in the embodiment.
Figure 15:
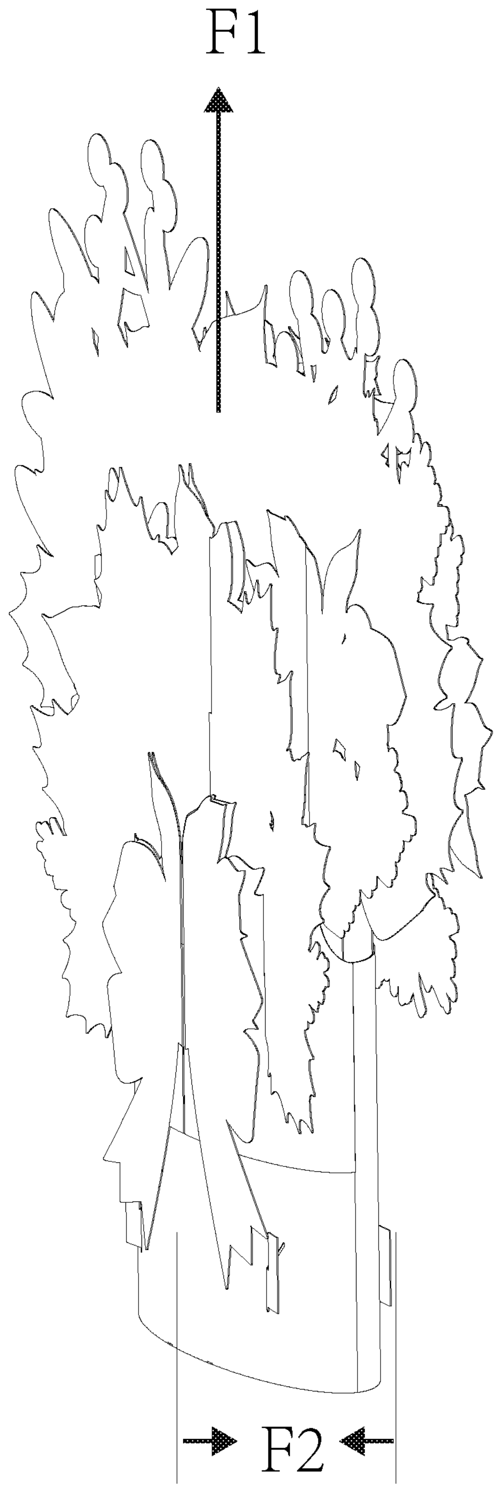
FIG. 15 is the structural schematic diagram of a three-dimensional bouquet greeting card pressed into a flat state described in the embodiment.
Figure 16:
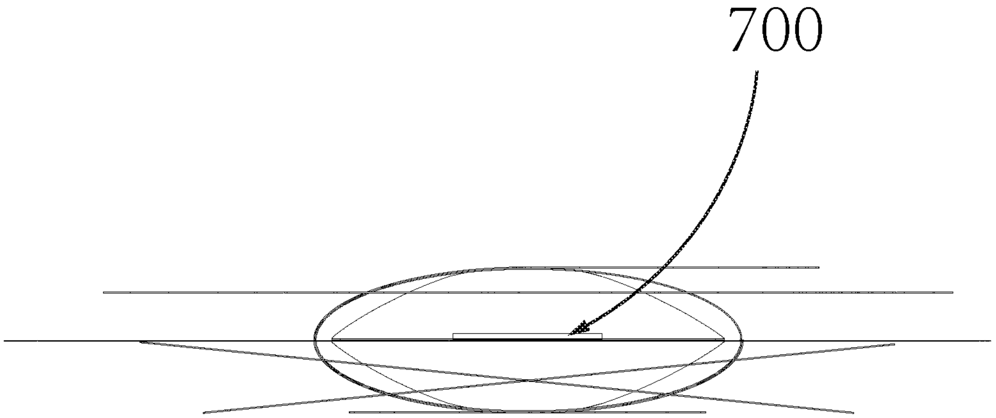
FIG. 16 is the top view of FIG. 15.

Working Principle:

When the three-dimensional bouquet greeting card shown in FIG. 1 is unfolded, it is in a three-dimensional display state and can simulate a bouquet, presenting a display effect. When it needs to be stored or transported, as shown in FIG. 5 or FIG. 15, pull the central petal 103 upward along the direction F1, and at the same time apply pressure along the direction F2. The bouquet greeting card can be pressed into a flat state, thereby facilitating storage and transportation.

For those skilled in the art, it is obvious that the present invention is not limited to the details of the above exemplary embodiments. Moreover, without departing from the spirit or essential characteristics of the present invention, it can be implemented in other specific forms. Therefore, no matter from which point of view, the embodiments should be regarded as exemplary and not restrictive. The scope of the present invention is defined by the appended claims rather than the above description. Therefore, all changes falling within the meaning and scope of the equivalent elements of the claims are encompassed within the present invention. Any reference signs in the claims should not be regarded as limiting the involved claims.

In addition, it should be understood that although this specification is described in accordance with implementation methods, not each implementation method only contains an independent technical solution. The description of this specification in this way is only for clarity. Those skilled in the art should regard the specification as a whole, and the technical solutions in each implementation method can also be appropriately combined to form other implementation methods that can be understood by those skilled in the art.

The invention claimed is:

1. A three-dimensional bouquet greeting card, comprising:
- a flower bundle base; and
- at least one internal petal insert coupled with the flower bundle base;
- characterized in that said the flower bundle base is formed by bonding opposite ends of a single planar plate together end to end, a pair of folding indentation lines are symmetrically disposed on a left end and a right end of the flower bundle base respectively, a bottom cover is partially integrally connected with a bottom portion of the flower bundle base, a single folding indentation line is further disposed in a middle region of the bottom cover, the folding indentation line of the bottom cover is integrally connected to an inner central petal that is part of the at least one internal petal insert, and the folding indentation line of the bottom cover is located on a same plane as the folding indentation lines disposed on the flower bundle base for folding the flower bundle base.

2. The three-dimensional bouquet greeting card as claimed in claim 1, characterized in that said the flower bundle base is formed from a single piece of paper sheet, the single piece of paper sheet is cut, folded and bonded to integrally form a flower bundle base, the bottom cover and the inner central petal, and the inner central petal is configured to move in a vertical direction relative to the flower bundle base, such that the three-dimensional bouquet greeting card is switchable between a flat storage state and a three-dimensional display state.

3. The three-dimensional bouquet greeting card as claimed in claim 1, further comprising a surrounding petal fixedly attached to an outer side wall of the flower bundle base, characterized in that said a plurality of clamping grooves are formed on an inner surface of the surrounding petal, the plurality of clamping grooves being configured to clamp and fix the at least one internal petal insert to the surrounding petal.

4. The three-dimensional bouquet greeting card as claimed in claim 3, characterized in that a plurality of positioning grooves are recessedly formed in an inner side wall of flower bundle base, the plurality of positioning grooves being aligned with the plurality of clamping grooves on the surrounding petal and configured for mounting and positioning the at least one internal petal insert to the flower bundle base.

5. The three-dimensional bouquet greeting card as claimed in claim 3, further comprising a plurality of internal shaped petal inserts disposed inside the three-dimensional bouquet greeting card and coupled with both the flower bundle base and the surrounding petal, characterized in that said the plurality of internal shaped petal inserts being in addition to the inner central petal.

6. The three-dimensional bouquet greeting card as claimed in claim 5, characterized in that said each of the plurality of internal shaped petal inserts consists of two separate petal insertion pieces, the two petal insertion pieces intersect with each other and form an X-shaped cross configuration when unfolded, the two petal insertion pieces are removably installed in a cavity defined by the flower bundle base, and the two petal insertion pieces are configured to be opened to the X-shaped cross configuration or folded to a flat configuration.

7. The three-dimensional bouquet greeting card as claimed in claim 6, characterized in that said each of the plurality of internal shaped petal insert is a single-piece petal, the single-piece petal is provided with at least one vertical indentation line extending along a height direction of the single-piece petal, the single-piece petal is removable installed in the cavity defined by the flower bundle base, an upper surface of the single-piece petal is clamped with one of the plurality of clamping groove on the surrounding petal, and a lower surface of the single-piece petal is clamped and fixed with one of a plurality of positioning groove on the flower bundle base.

8. The three-dimensional bouquet greeting card as claimed in claim 1, further comprising an acousto-optic device fixedly disposed inside a hollow cavity of the flower bundle base, characterized in that said the acousto-optic device is electrically connected to a trigger switch, and the trigger switch is configured to be activated when the three-dimensional bouquet greeting card is switched from the flat storage state to the three-dimensional display state to operate the acousto-optic device.

* * * * *